US011163998B2

(12) United States Patent
Hess et al.

(10) Patent No.: US 11,163,998 B2
(45) Date of Patent: Nov. 2, 2021

(54) SYSTEMS AND METHODS FOR AUTOMATED IMAGE LABELING FOR IMAGES CAPTURED FROM VEHICLES

(71) Applicant: Woven Planet North America, Inc., Los Altos, CA (US)

(72) Inventors: Wolfgang Hess, Munich (DE); Clemens Marschner, Munich (DE); Holger Rapp, Munich (DE)

(73) Assignee: Woven Planet North America, Inc., Los Altos, CA (US)

( * ) Notice: Subject to any disclaimer, the term of this patent is extended or adjusted under 35 U.S.C. 154(b) by 131 days.

(21) Appl. No.: 16/167,170

(22) Filed: Oct. 22, 2018

(65) Prior Publication Data
US 2020/0125845 A1 Apr. 23, 2020

(51) Int. Cl.
| | | |
|---|---|---|
| *G06K 9/00* | (2006.01) | |
| *G01C 21/32* | (2006.01) | |
| *G05D 1/00* | (2006.01) | |
| *G05D 1/02* | (2020.01) | |
| *G06F 16/29* | (2019.01) | |

(52) U.S. Cl.
CPC ......... *G06K 9/00671* (2013.01); *G01C 21/32* (2013.01); *G05D 1/0088* (2013.01); *G05D 1/024* (2013.01); *G05D 1/0246* (2013.01); *G06F 16/29* (2019.01); *G06K 9/00818* (2013.01); *G05D 2201/0213* (2013.01)

(58) Field of Classification Search
None
See application file for complete search history.

(56) References Cited

U.S. PATENT DOCUMENTS

| 10,445,772 B1* | 10/2019 | Chau ................... G06T 7/337 |
| 2010/0215254 A1 | 8/2010 | Prokhorov |
| 2012/0328150 A1 | 12/2012 | Pelz et al. |
| 2018/0012082 A1* | 1/2018 | Satazoda ............ G06K 9/00805 |
| 2018/0181139 A1 | 6/2018 | Ishii et al. |
| 2019/0286915 A1* | 9/2019 | Patil ..................... G06T 7/73 |
| 2019/0318544 A1* | 10/2019 | Skidmore ............ G06T 19/006 |
| 2020/0053292 A1* | 2/2020 | Janjic ................... G06T 7/70 |

FOREIGN PATENT DOCUMENTS

| JP | 2015-032133 A | 2/2015 |
| JP | 2018-106666 A | 7/2018 |

OTHER PUBLICATIONS

International Application No. PCT/US2019/057273, International Search Report and Written Opinion dated Feb. 14, 2020, 8 pages.

* cited by examiner

*Primary Examiner* — Stuart D Bennett
(74) *Attorney, Agent, or Firm* — Christopher G. Darrow; Darrow Mustafa PC

(57) ABSTRACT

Systems, methods, and non-transitory computer-readable media can determine a first label at a first position in a first image captured from a vehicle, the first label indicating that a first object is depicted in the first image at the first position, wherein the first image is a two-dimensional image. The first object is identified in a three-dimensional coordinate space representative of an environment of the vehicle based on the first position of the first label within the first image. A second label is automatically generated at a second position in a second image captured from the vehicle based on simultaneous localization and mapping (SLAM) information associated with the vehicle. The second label indicates that the first object is depicted in the second image at the second position.

20 Claims, 16 Drawing Sheets

SYSTEMS AND METHODS FOR AUTOMATED IMAGE LABELING FOR IMAGES CAPTURED FROM VEHICLES

FIELD OF THE INVENTION

The present technology relates to machine learning, and automated object detection and labeling. More particularly, the present technology relates to systems, apparatus, and methods for automated image labeling for images captured from autonomous, semi-autonomous, or manually driven vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine a first label at a first position in a first image captured from a vehicle, the first label indicating that a first object is depicted in the first image at the first position, wherein the first image is a two-dimensional image. The first object is identified in a three-dimensional coordinate space representative of an environment of the vehicle based on the first position of the first label within the first image. A second label is automatically generated at a second position in a second image captured from the vehicle based on simultaneous localization and mapping (SLAM) information associated with the vehicle. The second label indicates that the first object is depicted in the second image at the second position.

In an embodiment, the three-dimensional coordinate space comprises a point cloud.

In an embodiment, the point cloud is generated based on a set of lidar data captured by a lidar system mounted to the vehicle.

In an embodiment, the set of lidar data was captured by the lidar system at approximately the same time the first image was captured.

In an embodiment, identifying, based on the first position of the first label, the first object in the three-dimensional coordinate space comprises: determining a position of the first label within the three-dimensional coordinate space.

In an embodiment, automatically generating the second label at the second position in the second image comprises: determining, based on SLAM information associated with the vehicle, a change in position between the first object and the vehicle from a first time to a second time, wherein the first image was captured at approximately the first time, and the second image was captured at approximately the second time.

In an embodiment, automatically generating the second label at the second position in the second image further comprises: determining, within the three-dimensional coordinate space, an updated position of the first label with respect to the vehicle based on the change in position.

In an embodiment, automatically generating the second label at the second position in the second image further comprises: converting the updated position of the first label with respect to the vehicle to a two-dimensional position in the second image.

In an embodiment, identifying, based on the first position of the first label, the first object in the three-dimensional coordinate space comprises: determining an object frustum within the three-dimensional coordinate space based on the first position of the first label in the first image and camera information associated with the camera, and determining a nearest object to the vehicle within the object frustum. The camera information includes at least one of: a position of the camera within the three-dimensional coordinate space, a direction of the camera within the three-dimensional coordinate space, and an angle of view of the camera.

In an embodiment, determining the first label at the first position in the first image comprises receiving a manual label by a human operator viewing the first image.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
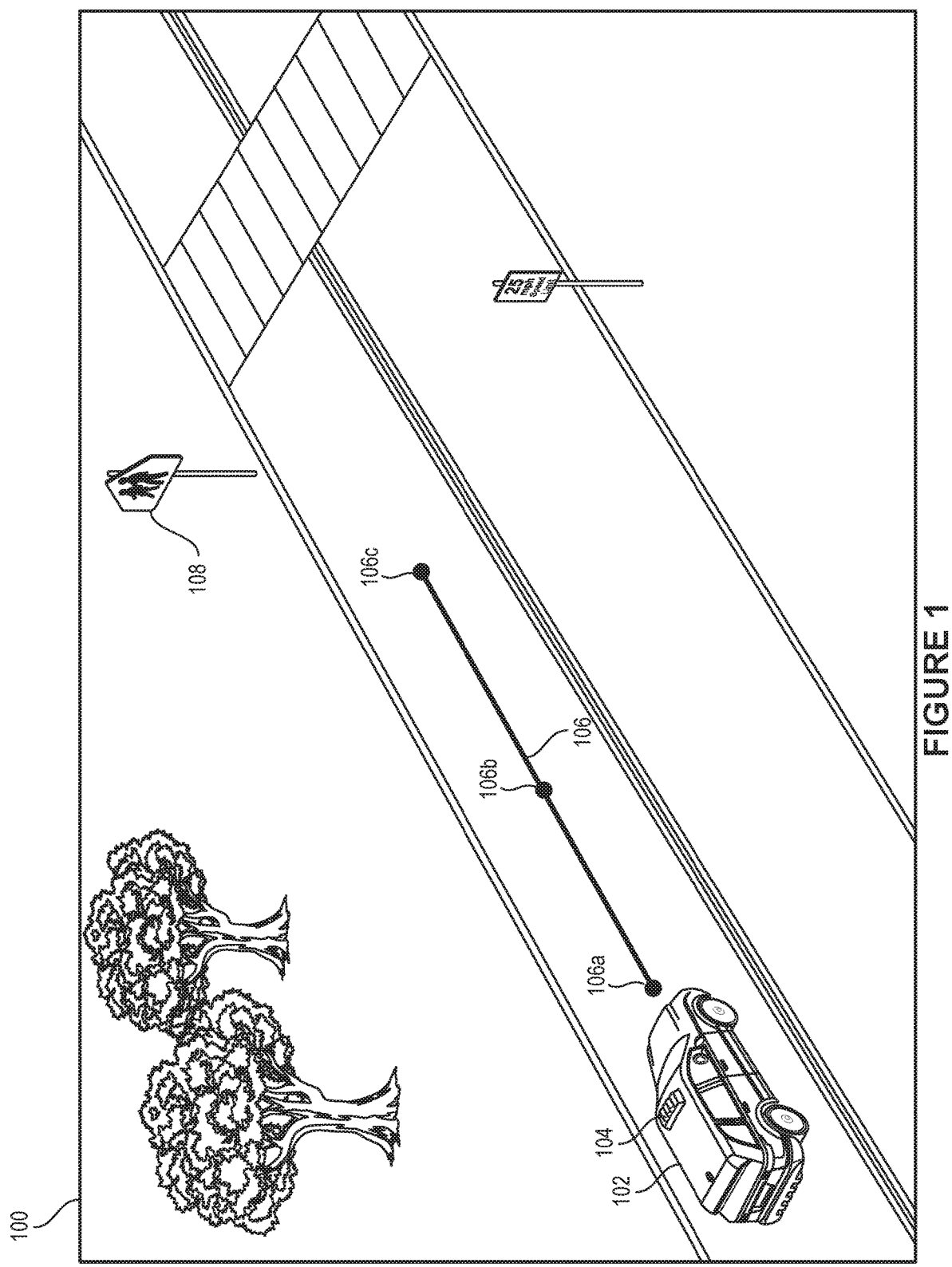
FIG. 1 illustrates an example scenario demonstrating various challenges that may be experienced in generating training data for training a machine learning model.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Autonomous, semi-autonomous, or manually-driven vehicles can include and/or utilize one or more trained machine learning models. For example, one or more machine learning models can be trained to identify objects in a vehicle's surrounding environment based on data received from one or more sensors. In order to accurately train such machine learning models, large sets of training data may be required in order to ensure that the models are sufficiently trained and can reliably identify objects in a vehicle's environment. However, conventional approaches to generating sets of training data for training machine learning models are often inefficient, time-consuming, and expensive. For example, under conventional approaches, human operators may be tasked with reviewing images captured from a vehicle, and labeling objects within each image. However, in order to develop a sufficiently large set of training data, human operators may be required to manually label thousands, hundreds of thousands, or even millions of images. Such approaches are very time consuming, and very expensive. Attempts to automate such processes may require human supervision or review during training/ learning, or may not be sufficiently reliable, given that machine learning models utilized in vehicles will have an impact on rider safety and public safety. Conventional approaches pose disadvantages in addressing these and other problems.

Figure 2A:
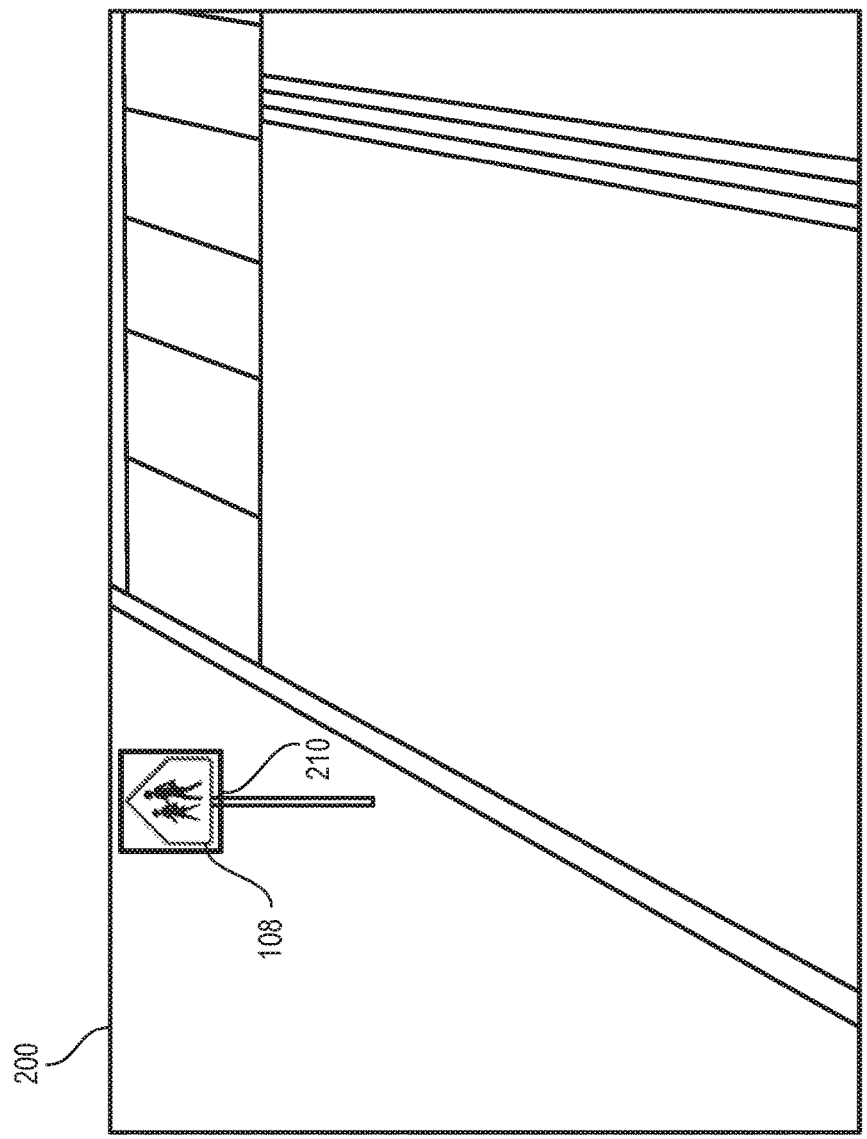
FIGS. 2A-2C illustrate various challenges that may be experienced in generating training data for training a machine learning model.
Figure 2B:
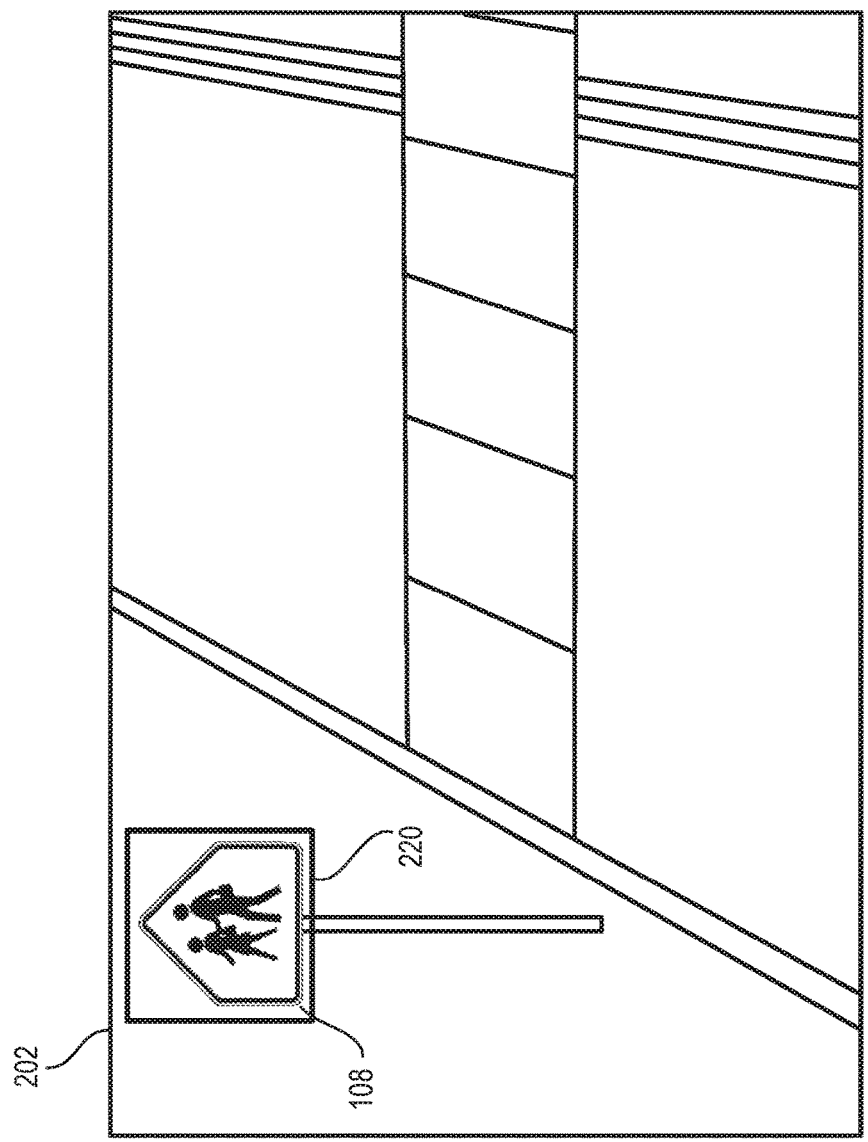
Figure 2C:
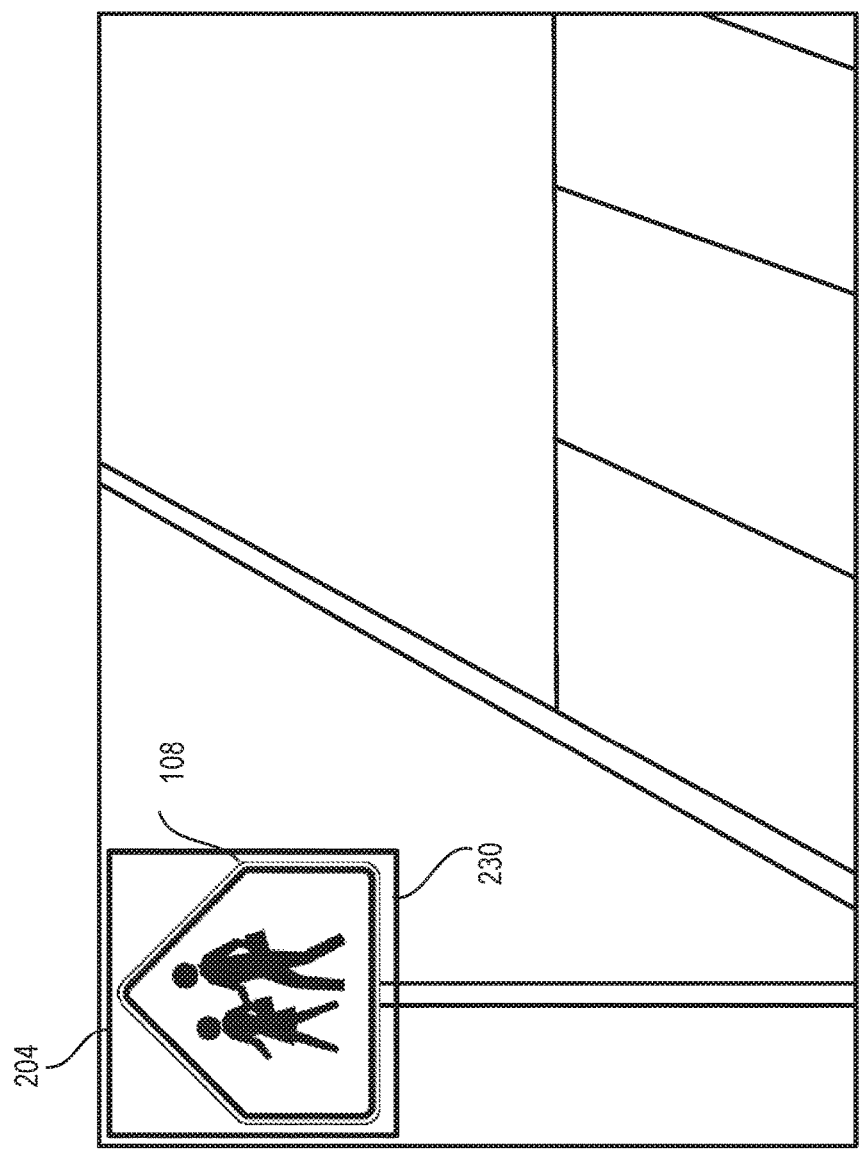

FIGS. 1 and 2A-C depict example scenarios that are illustrative of various challenges that may be experienced using conventional approaches to training machine learning models. In FIG. 1A, a vehicle 102 is shown traveling on a path 106. The vehicle 102 includes a camera 104. The camera 104 may be one sensor among a plurality of sensors in a vehicle sensor suite mounted on the vehicle 102. As the vehicle 102 drives, the camera 104 captures a variety of images that can be used as training data for training a machine learning model. For example, the camera 104 may capture a first image at a position 106a, a second image at a position 106b, and a third image at a position 106c. Vehicle-mounted cameras may capture a very large number of images in a relatively short time, e.g., 60 images per second. FIG. 2A depicts a first image 200 captured at the position 106a, FIG. 2B depicts a second image 202 captured at the position 106b, and FIG. 2C depicts a third image 204 captured at the position 106c. As can be seen in the figures, a cross-walk sign 108 is located substantially in front of the vehicle 102, and can be seen in each of the images 200, 202, 204. Under conventional approaches, a human operator may be tasked with reviewing each image 200, 202, 204, and manually labeling each instance in which a cross-walk sign (e.g., the cross-walk sign 108) is depicted. For example, in the image 200, the operator may utilize a computing device user interface to manually draw a rectangle 210 to indicate that a cross-walk sign is depicted in the image 200 within the rectangle 210. Similarly, the operator may draw a rectangle 220 in the image 202, and another rectangle 230 in the image 204. As discussed above, the operator may be tasked with reviewing thousands of similar images, or more, and labeling cross-walk signs in each image. Considering that vehicle cameras (e.g., the camera 104) can capture images at a rate of 60 frames per second, or even higher, operators may be tasked with labeling a very large number of very similar images. Such approaches are time-consuming, inefficient, and expensive.

An improved approach in accordance with the present technology overcomes the foregoing and other disadvantages associated with conventional approaches. The improved approach can receive a first label indicating a location or position of an object in a single image of a set of images captured from a vehicle. For example, the label may be a label that is manually placed by an operator, or a label that is automatically derived (e.g., using an object recognition model). Vehicle information associated with the vehicle can then be utilized to automatically label the object in one or more additional images in the set of images. In an embodiment, simultaneous mapping and localization (SLAM) information can be used to precisely determine the vehicle's movement relative to the labeled object during the time (e.g., seconds) immediately before and/or after the first labeled image was captured. Vehicle movement information can then be used to determine an updated position of the object with respect to the vehicle, and the object's updated position with respect to the vehicle can be used to determine, for a subsequent image, where in the subsequent image the object should appear. The object's predicted location within the subsequent image can be used to automatically generate a label for the object within the subsequent image. Labels for the object can be generated in other images in the set of images in a similar manner. As just one example, if an operator manually labels an object in a first image of a set of sequential images taken from a vehicle, SLAM information for the vehicle can be used to automatically label the object in a set of images taken a relatively short time (e.g., 1-5 seconds) after the first image was captured. As mentioned, cameras on vehicles may be configured to capture 60 frames per second, or more. As such, a single manual label by a human operator can result in automatic labeling of, for example, hundreds of additional images. More details relating to the present technology are provided below.

Figure 3:
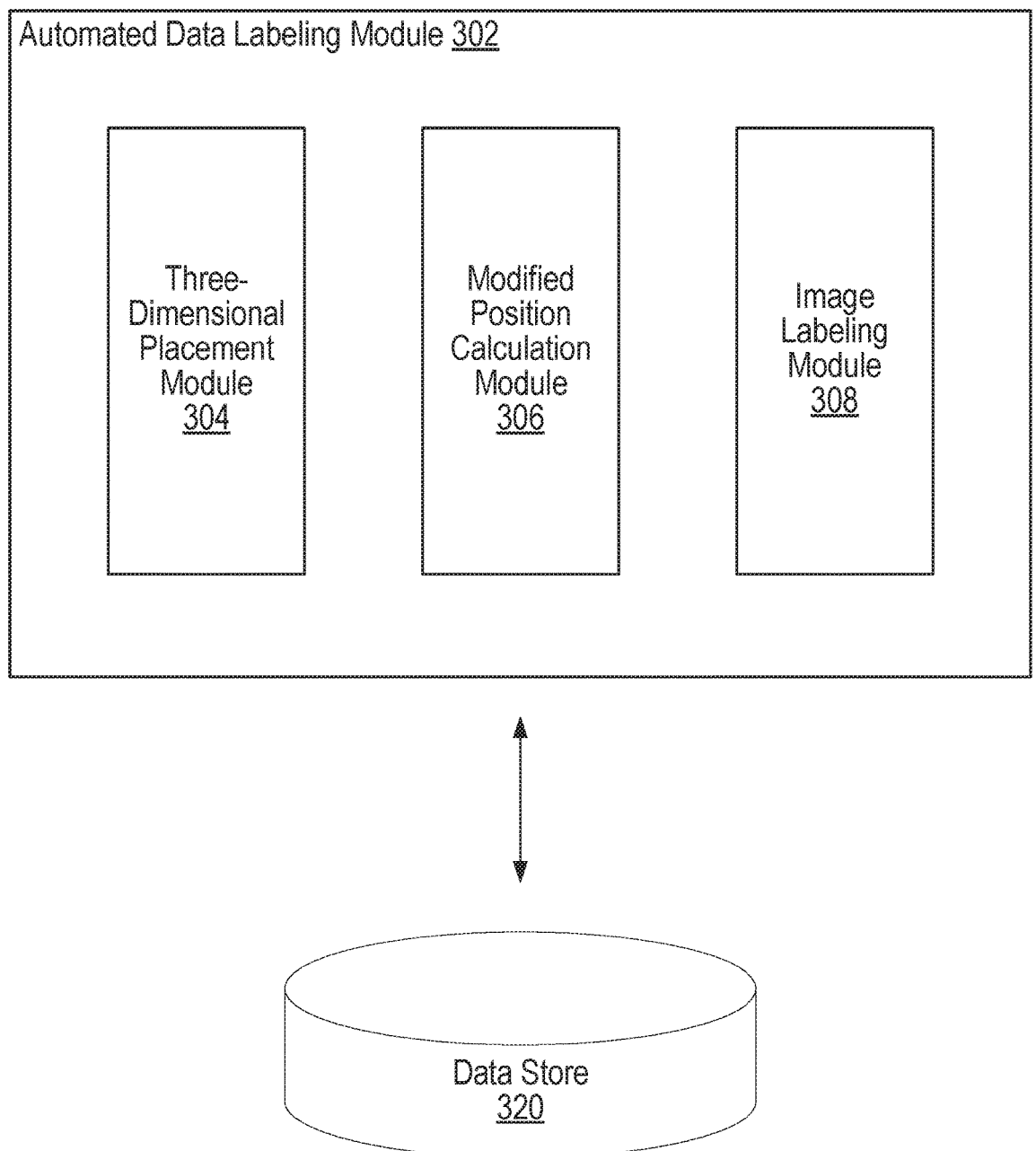
FIG. 3 illustrates an example automated data labeling module, according to an embodiment of the present technology.

FIG. 3 illustrates an example system 300 including an example automated data labeling module 302, according to an embodiment of the present technology. As shown in the example of FIG. 3, the automated data labeling module 302 can include a three-dimensional placement module 304, a modified position calculation module 306, and an image labeling module 308. In some instances, the example system 300 can include at least one data store 320. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the automated data labeling module 302 and its sub-modules may be performed by one or more backend computing systems, such as a transportation management system 660 of FIG. 6. In some embodiments, some or all of the functionality performed by the automated data labeling module 302 and its sub-modules may be performed by one or more computing systems implemented in a vehicle, such as a vehicle 640 of FIG. 6.

The automated data labeling module 302 can be configured to communicate and operate with the at least one data store 320, as shown in the example system 300. The at least one data store 320 can be configured to store and maintain various types of data. For example, the data store 320 can store one or more images captured from one or more vehicles, vehicle SLAM information for one or more vehicles, camera information for one or more cameras mounted to one or more vehicles, manual label information for a set of images, and the like. In some embodiments, some or all data stored in the data store 320 can be stored by the transportation management system 660 of FIG. 6. In some embodiments, some or all data stored in the data store 320 can be stored by the vehicle 640 of FIG. 6. More details about information that can be stored in the data store 320 are provided below.

The three-dimensional placement module 304 can be configured to receive a label indicating the position of an object depicted in a first image, and to identify the object within a three-dimensional coordinate space based on the label. The label may be, in various embodiments, a manual label provided by an operator, or an automatically generated label. The three-dimensional placement module 304 can be configured to receive a label of an object depicted in a two-dimensional image, and to identify the labeled object in a three-dimensional coordinate space associated with the two-dimensional image. In certain embodiments, as a vehicle is driving, a camera mounted on the vehicle may be configured to capture images. The camera mounted on the vehicle may be one sensor out of a plurality of sensors in a vehicle sensor suite mounted to the vehicle. As the camera is capturing images from the vehicle, other sensors in the vehicle sensor suite may be simultaneously capturing other types of data. The other sensors can include, for example, lidar systems, radar systems, inertial measurement unit (IMU) systems, ultrasound systems, additional (optical or infrared) cameras, etc. Data captured simultaneously or nearly simultaneously by the one or more sensors in the vehicle sensor suite may be associated with one another. For example, time stamps can be used to determine that an image captured by a camera was captured at the same time, or approximately the same time, as a set of data captured by a lidar system, a set of data captured by a radar system, a set of data captured by an IMU system, an ultrasounds system, etc. Data from one or more sensors in a vehicle sensor suite can be used to generate, within a three-dimensional coordinate space, a three-dimensional representation of a vehicle's surrounding environment at the time an image was captured. For example, if a first image was captured by a camera on a vehicle at a particular time, lidar data captured at approximately the same time can be used to create a three-dimensional point cloud representation of the vehicle's surrounding environment at the time the first image was captured. As discussed above, in certain embodiments, time stamp information can be used to associate the first image with the set of lidar data. While the example of a lidar is used here, it should be understood that data from other sensors can be used or combined to generate the three-dimensional representation of the vehicle's surrounding environment.

As mentioned above, the three-dimensional placement module 304 can be configured to receive a label of an object depicted in an image, such as a two-dimensional image. For example, in one embodiment, an image captured by a camera from a vehicle may be presented to a human operator, and the human operator may manually label an object in the image. The human operator in relation to the object may, for example, draw as the label a rectangle, or any other shape, on the image, to identify the position of the object within the image. In other embodiments, the label may be automatically generated, for example, using an object recognition model. The three-dimensional placement module 304 can receive the label identifying the position of the object within the two-dimensional image. The three-dimensional placement module 304 can also identify a three-dimensional coordinate space that includes a three-dimensional representation of the vehicle's surrounding environment at approximately the time the image was captured. For example, the three-dimensional representation can be a point cloud representation of the vehicle's surrounding environment generated using data captured by a lidar system mounted to the vehicle. The three-dimensional representation of the vehicle's surrounding environment may also include the vehicle's position within the three-dimensional coordinate space when the image was captured. The three-dimensional placement module 304 can also receive camera information associated with the camera that captured the image. For example, camera information can include the position of the camera on the vehicle, the angle at which the camera was mounted on the vehicle, the position and direction of the camera within the three-dimensional coordinate space, and/or an angle of view of the camera, and the like. This camera information can be used to determine a view frustum for the camera within the three-dimensional coordinate space, as will be described in greater detail below. The three-dimensional placement module 304 can utilize the two-dimensional position of the object label in the image, the three-dimensional representation associated with the image (i.e., associated with the time the image was captured), SLAM information associated with the vehicle, and the camera information to determine the position of the labeled object within the three-dimensional environmental representation.

Figure 4A:
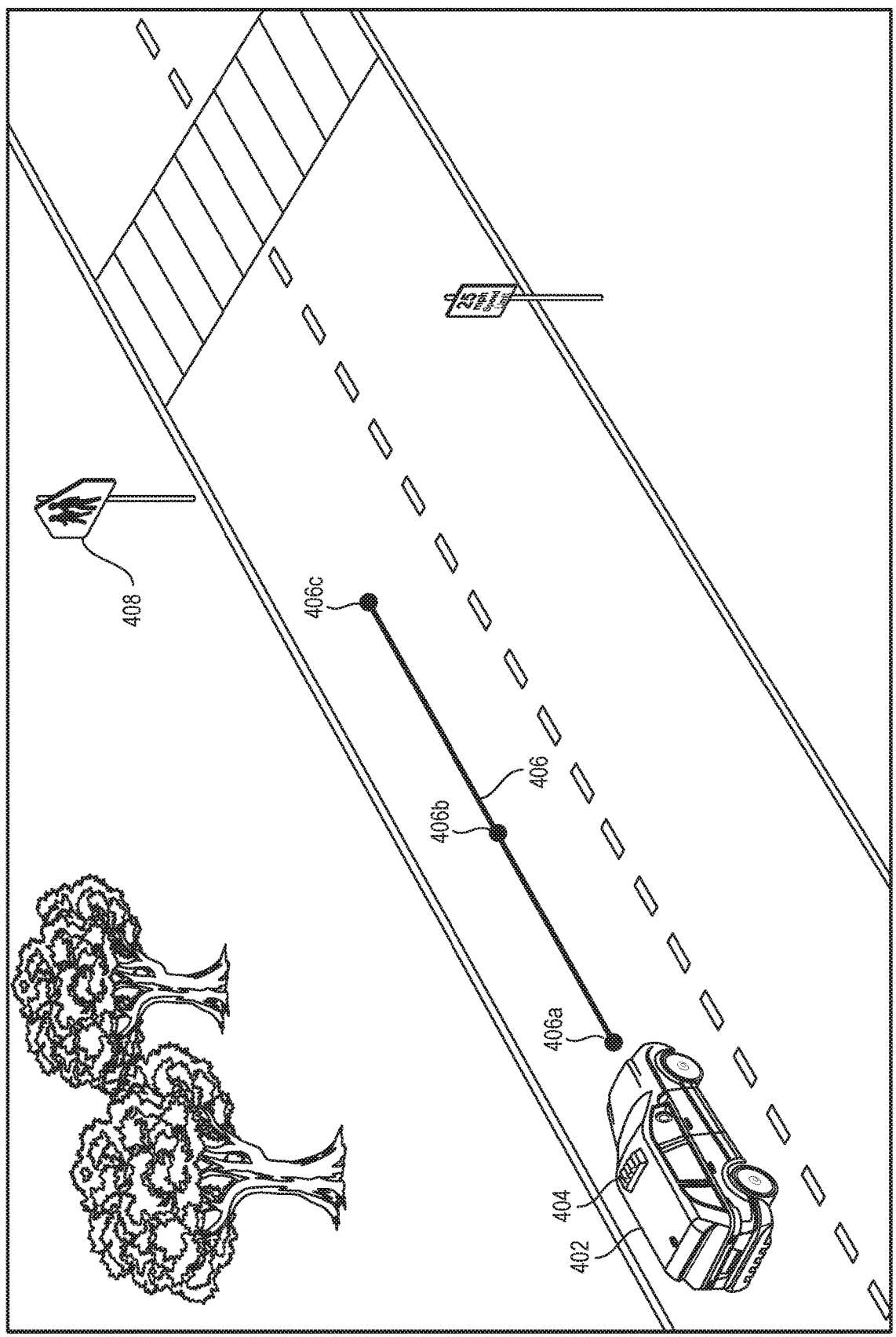
FIGS. 4A-4H illustrate example scenarios, according to various embodiments of the present technology.
Figure 4B:
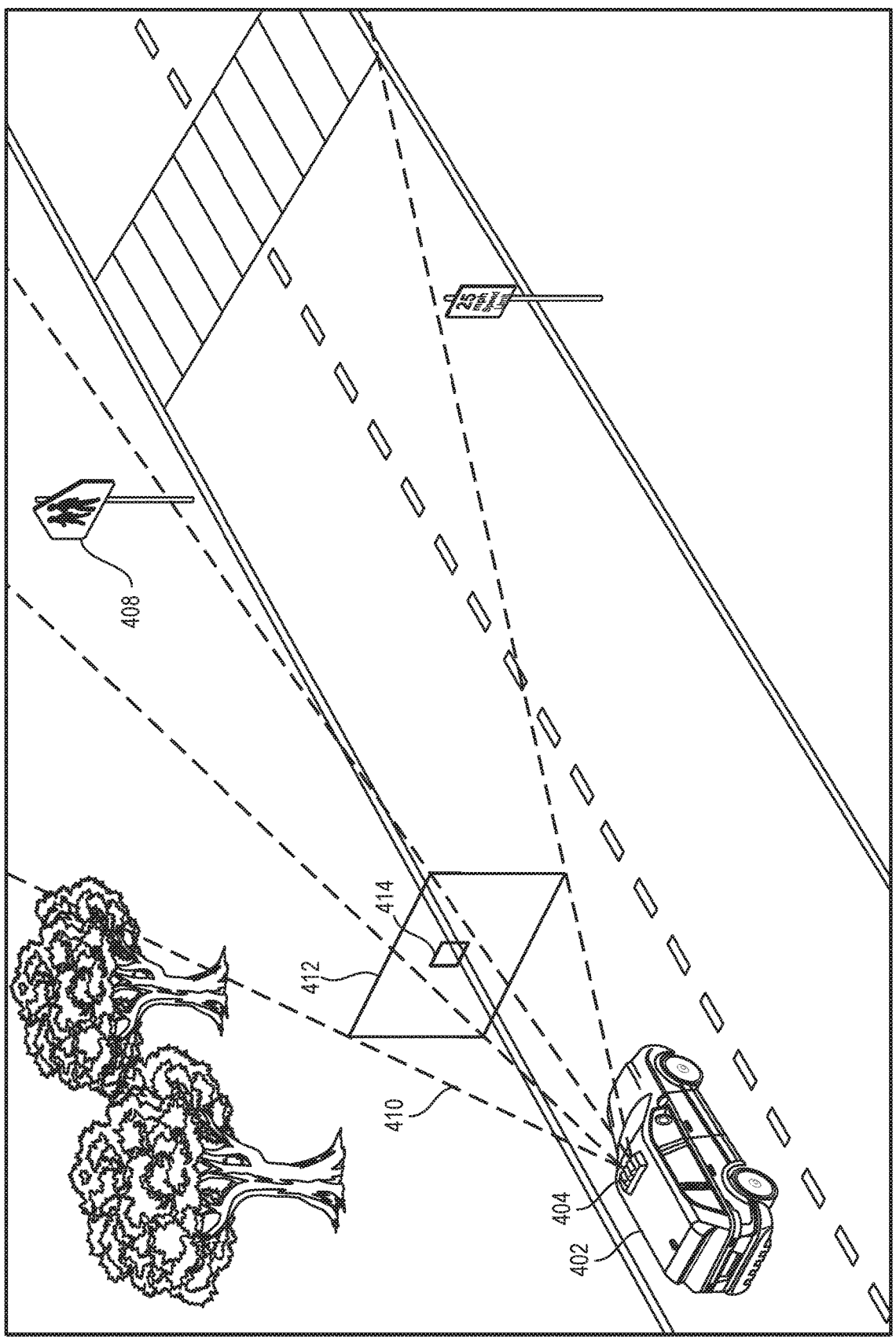

FIGS. 4A-4H illustrate an example scenario to illustrate the present technology. During discussion of the automated data labeling module 302, and its sub-modules, reference will periodically be made to these figures to provide further explanation by way of an exemplary implementation and scenario. FIG. 4A depicts a digital three-dimensional representation of an environment of a vehicle 402 in a three-dimensional coordinate space. The three-dimensional representation can be, for example, a point cloud representation of the environment generated based on data captured by a lidar system in a sensor suite of the vehicle 402. The sensor suite can also include a camera 404. As the vehicle 402 drives along a path 406, the camera 404 captures images at positions 406a, 406b, and 406c. The captured images can be used to train a machine learning model to automatically identify cross-walk signs, such as a cross-walk sign 408. In certain embodiments, the captured images may also be used to identify locations of objects in a three-dimensional representation of a vehicle's environment based on the two-dimensional images captured by the camera, as will be described in greater detail herein. FIG. 4B depicts the three-dimensional representation of the environment of the vehicle 402 that was depicted in FIG. 4A. In FIG. 4B, the camera 404 mounted on the vehicle 402 has captured an image 412, and the image 412 has been labeled (e.g., manually or automatically) with a rectangular label 414 identifying the position of the cross-walk sign 408 within the image 412. The image 412 and the label 414 are not actually present in the three-dimensional representation of the environment of the vehicle 402, but are presented in FIG. 4B to aid in explanation of various features and concepts. The camera's view at the time the image 412 was captured may be represented within the three-dimensional coordinate space by a view frustum 410. The view frustum 410 can be determined based on camera information including, for example, the angle at which the camera was mounted on the vehicle 402, a position of the camera on the vehicle 402, a position of the vehicle 402 within the three-dimensional coordinate space, a direction of the vehicle 402 within the three-dimensional coordinate space, a direction and/or position of the camera 404 within the three-dimensional coordinate space, an angle of view of the camera (i.e., the angular extent of a given scene that is captured by the camera), etc.

Figure 4C:
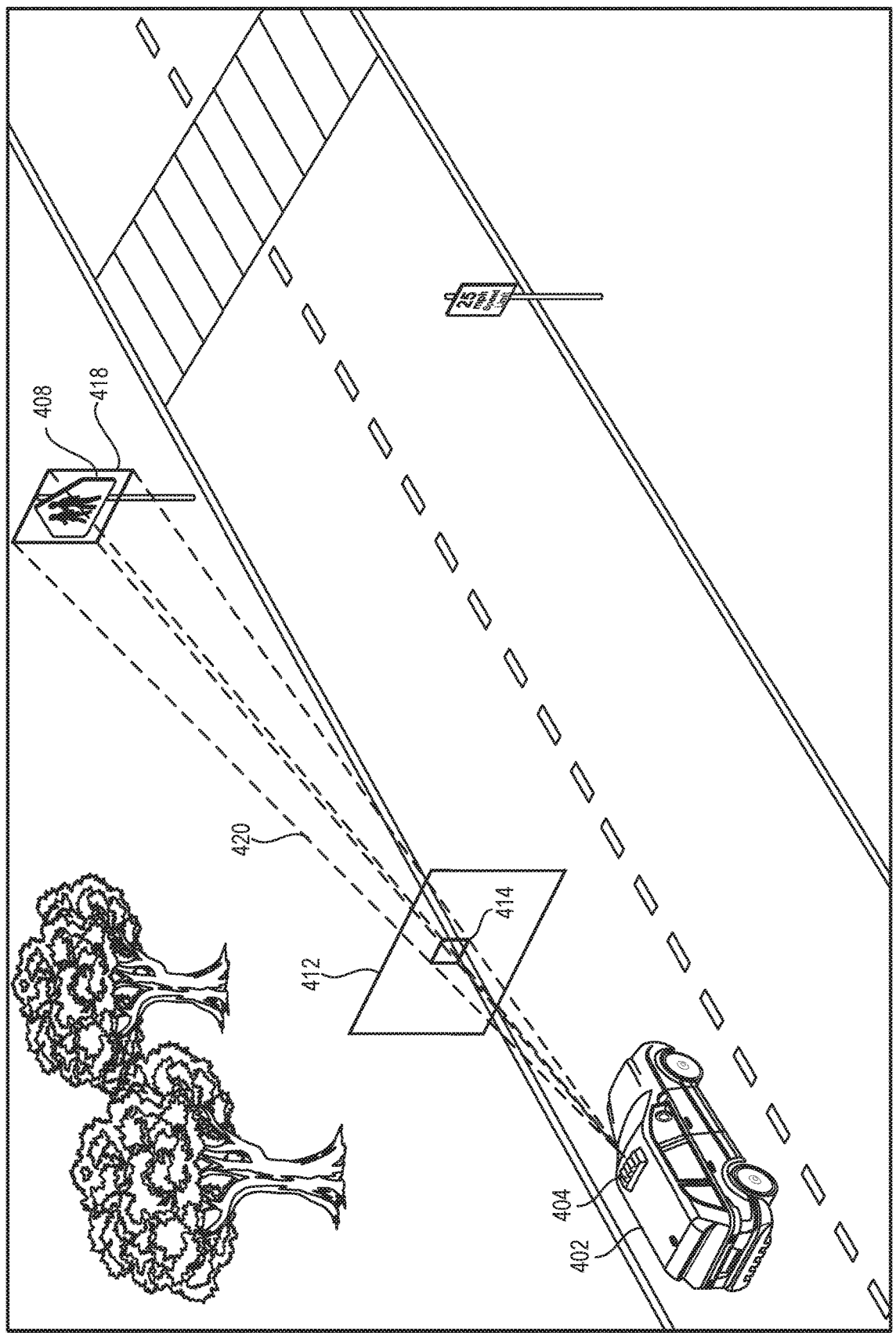

Returning to FIG. 3, the three-dimensional placement module 304 can utilize the two-dimensional position of a label in an image to define an object frustum within the three-dimensional coordinate space. The object frustum represents a three-dimensional region within the three-dimensional coordinate space that is contained within the view frustum of the camera. FIG. 4C depicts the digital three-dimensional representation of the environment of the vehicle 402 that was depicted in FIGS. 4A and 4B. In FIG. 4C, it can be seen that the label 414 in the image 412 has been used to generate a corresponding object frustum 420 within the three-dimensional representation. Comparison of FIGS. 4B and 4C demonstrates that the object frustum 420 is contained entirely within the view frustum 410 of the camera.

Figure 4D:
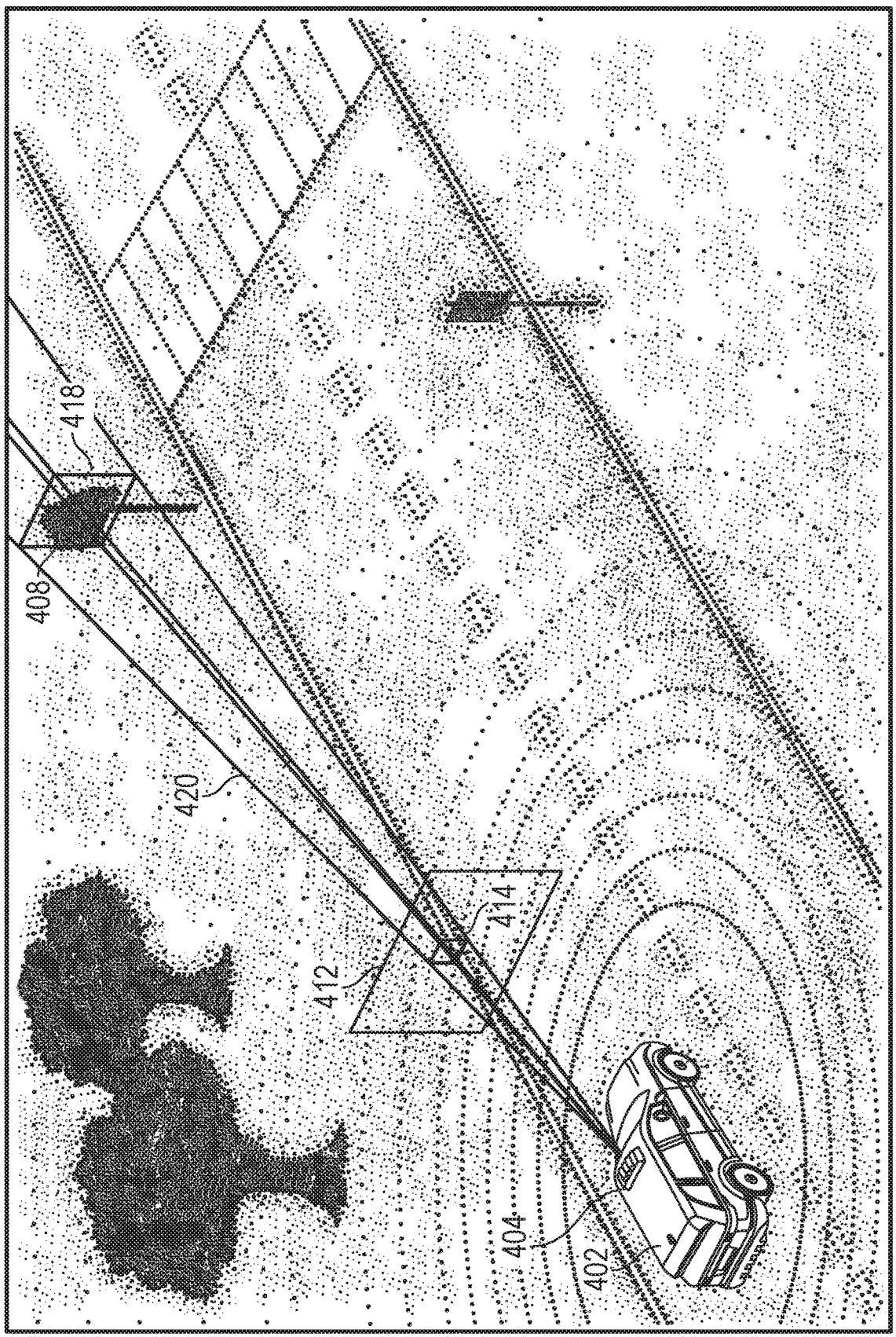

Once the object frustum 420 is determined, the three-dimensional placement module 304 can query data points located within the object frustum 420 to identify a closest object within the object frustum 420 to the vehicle 402. In order to more clearly demonstrate this concept, FIG. 4D illustrates the three-dimensional environment shown in FIG. 4C as a point cloud generated based on a set of data collected by a lidar system on the vehicle 402. It can be seen that objects within the three-dimensional representation can generally be identified as clusters of data points in the point cloud. In the example scenario shown in FIG. 4D, the closest object in the object frustum 420 is a cluster of points representing the cross-walk sign 408. In an embodiment, a height of the object frustum 420 may be limited to a maximum distance from the vehicle (e.g., within 25 m or within 50 m of the vehicle).

Figure 4E:
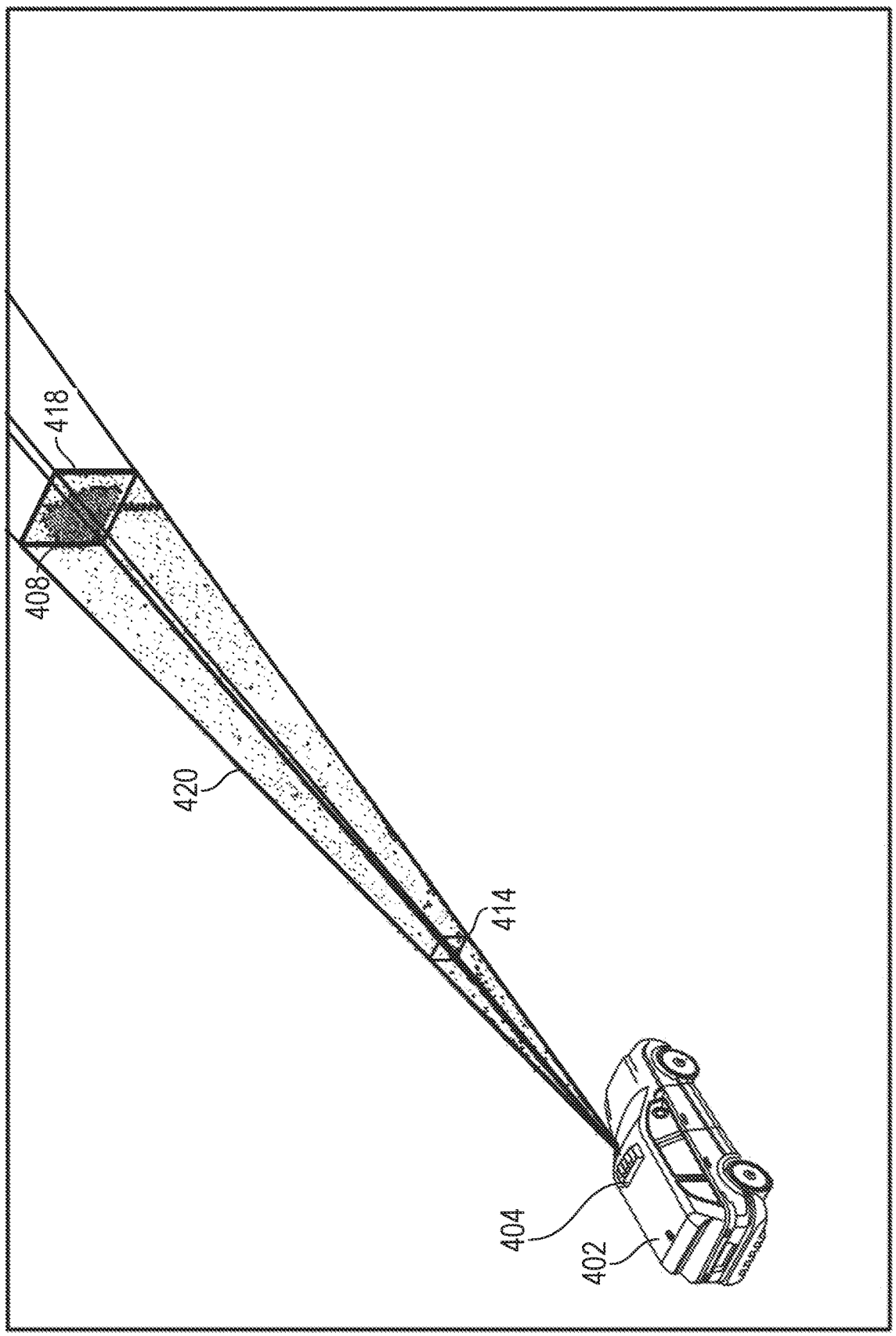
Figure 4F:
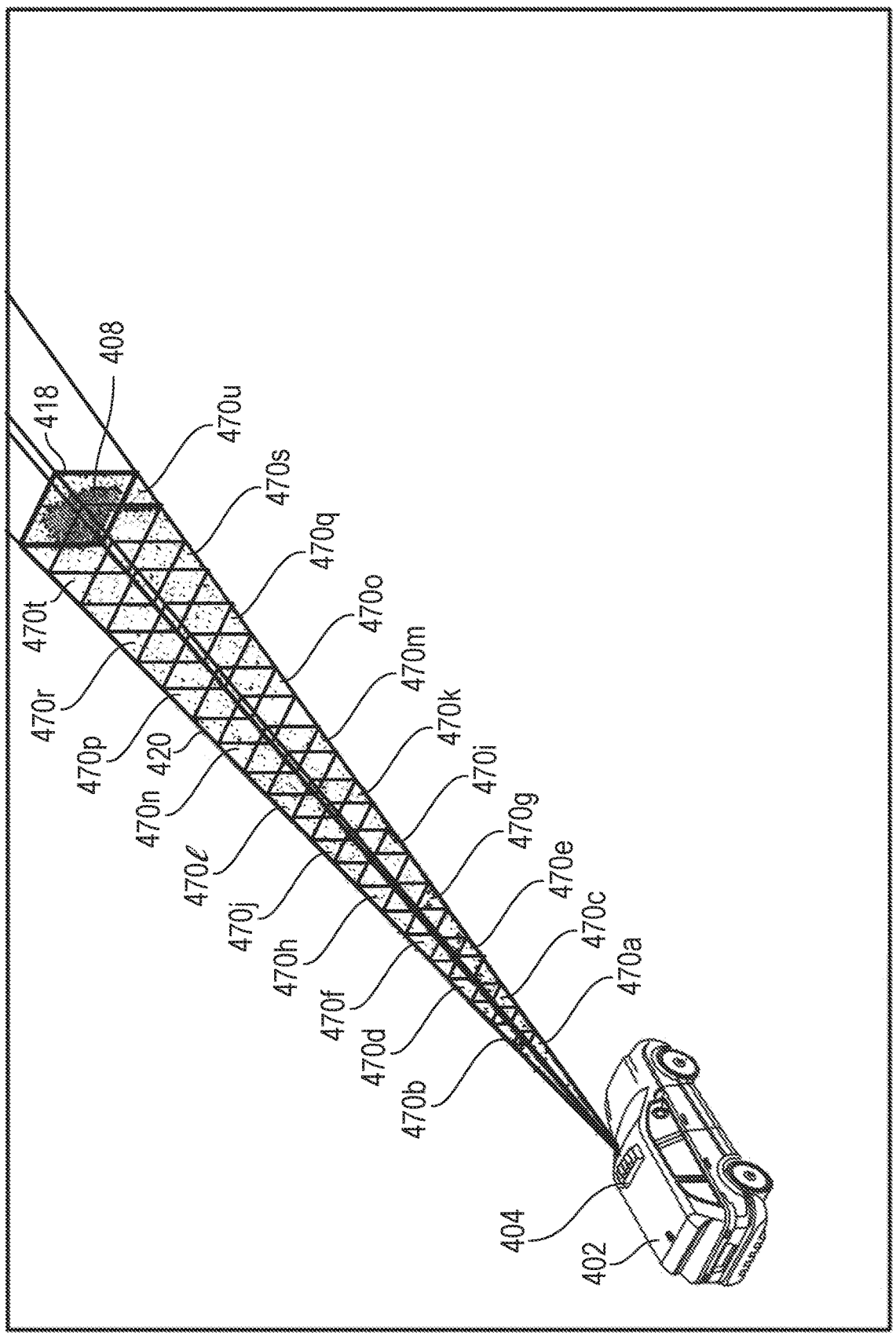

In an embodiment, data points within the object frustum 420 may be projected to a center ray of the object frustum 420 to create a one-dimensional histogram of data points. Data points may be, for example, data points captured by a lidar system to generate a point cloud. In FIG. 4E, the object frustum 420 has been isolated in order to more clearly demonstrate a set of data points contained within the object frustum 420. In an embodiment, the one-dimensional histogram and/or the object frustum 420 may be divided into bins, with each bin being associated with a discrete distance measurement from the vehicle 402 (and/or the camera 404). For example, each bin may cover 0.2 m of distance, such that a first bin covers the distance 0-0.2 m from the vehicle 402, a second bin covers the distance 0.2 m-0.4 m from the vehicle 402, and so forth. The position of the nearest object within the object frustum 420 can be determined based on the one-dimensional histogram. For example, the one-dimensional histogram can be analyzed to determine a first distance (e.g., a first bin) that satisfies a data point threshold or data point density threshold, or to identify a distance (e.g., a bin) having a largest number or largest density of data points. A plane that intersects the object frustum 420 can be generated at the first distance (e.g., within a first bin representative of or containing the first distance). The intersection between the plane and the object frustum 420 (which, in this example embodiment, is a quadrilateral), can be used to mark the location of the object in the three-dimensional coordinate space. An exemplary embodiment illustrating these concepts is provided in FIG. 4F. In FIG. 4F, the object frustum 420 has been divided into a plurality of bins 470a-u. Each bin may represent, for example, a distance of 0.2 m from the vehicle 402 (and/or the camera 404). It can be seen in the figure that each bin contains a set of zero or more data points. In an embodiment, the number of data points contained within each bin 470a-u may be plotted in a one-dimensional histogram. The position of the nearest object within the object frustum 420 may be determined based on the number and/or density of data points within each bin 470a-u. For example, it can be seen in FIG. 4F that bin 470u has the greatest number and greatest density of data points, as it contains a cluster of data points that are representative of the crosswalk sign 408. As such, it can be determined that an object is represented within the bin 470u, and a plane can be generated within the bin 470u. The intersection of the plane and the object frustum 420 may label a position of the object within the three-dimensional coordinate space.

In the example scenario shown in FIGS. 4C-F, the three-dimensional placement module 304 can generate a label 418 at the position of the nearest detected object (i.e., within bin 470u). The final, derived three-dimensional label 418 is shown in FIGS. 4C-F. Referring back to FIG. 4C, the label 418 is a representation of the label 414 within the three-dimensional coordinate space. The label 414 identifies the position of the cross-walk sign 408 within the two-dimensional image 412, and the label 418 identifies and/or indicates the position of the cross-walk sign 408 within the three-dimensional coordinate space. In this way, the three-dimensional placement module 304 has converted a two-dimensional object label identifying an object in a two-dimensional image into a three-dimensional position of the object within a three-dimensional coordinate space.

Returning to FIG. 3, the modified position calculation module 306 can be configured to utilize SLAM information associated with a vehicle to determine movement of the vehicle with respect to an identified object. As discussed above, the three-dimensional placement module 304 can be configured to receive a first label (e.g., a manual label or an automatic label) identifying the two-dimensional position of an object within a two-dimensional image, and convert that information into a three-dimensional position of the object within a three-dimensional coordinate space. Then, the three-dimensional position of the object with respect to the vehicle (and/or the camera mounted to the vehicle) can be determined. The modified position calculation module 306 can then utilize SLAM information associated with the vehicle to determine movement of the vehicle relative to the object within the three-dimensional coordinate space. This movement information can be used to determine how the vehicle moved with respect to the labeled object between two images. For example, consider an example scenario in which a first image is taken at t=0 seconds and a second image is taken at t=0.02 seconds. Further, consider that an object in the first image is manually labeled, and positions of the object and of the vehicle in a three-dimensional coordinate space are determined. SLAM information associated with the vehicle can be utilized to determine how the vehicle moved relative to the labeled object from t=0 to t=0.02.

Figure 4G:
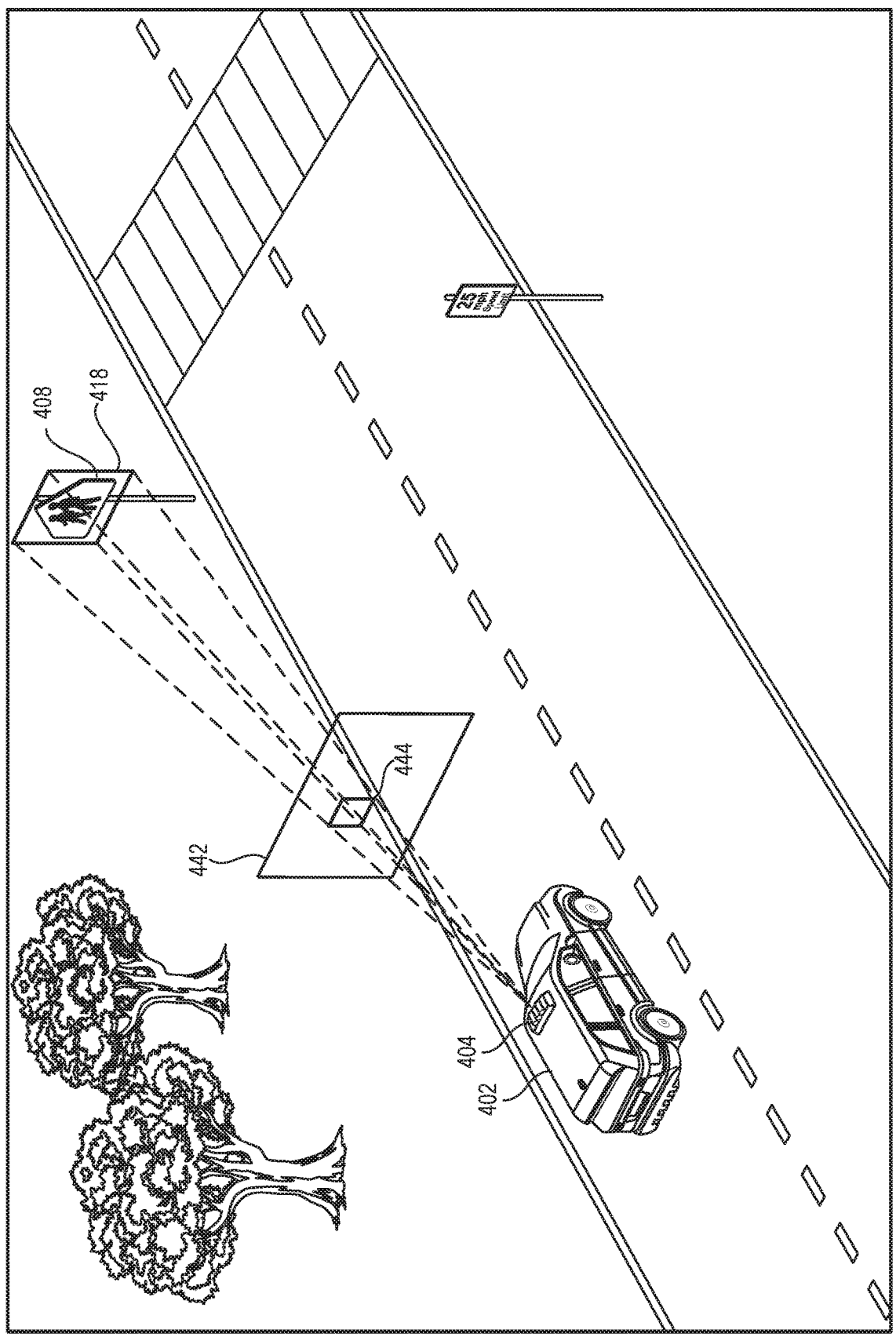

For example, consider the example scenario depicted in FIGS. 4C and 4G. As discussed above, in FIG. 4C, a camera on the vehicle 402 captured a first image 412. For purposes of explanation, the time at which the first image 412 was captured will be labeled t=0. FIG. 4G depicts a digital three-dimensional representation of the environment of the vehicle 402 at a later time when a second image is captured. In FIG. 4G, the vehicle 402 has moved forward several feet, and has captured a second image 442. For example, assume that the vehicle 402 has moved forward 10 feet along the road. The time at which the second image 442 was captured will be labeled t=1. At time t=0, the cross-walk sign 408 had a first position relative to the vehicle 402. For example, the four corners of the label 418 identifying the position of the cross-walk sign 408 may have had positions (x1, y1, z1), (x2, y2, z2), (x3, y3, z3), and (x4, y4, z4) relative to the vehicle 402. Then, at time t=1, the position of the label 418 with respect to the vehicle 402 has changed. For example, the four corners of the label 418 may now have updated coordinates (x5, y5, z5), (x6, y6, z6), (x7, y7, z7), and (x8, y8, z8) relative to the vehicle 402. The modified position calculation module 306 can be configured to utilize SLAM information to identify the updated position of the label 418 relative to the vehicle 402. For example, in the example scenario shown in FIGS. 4C and 4G, the modified position calculation module 306 can calculate updated coordinates for the label 418 based on, for example, velocity of the vehicle 402, acceleration of the vehicle 402, direction traveled by the vehicle 402, distance traveled by the vehicle 402 from time t=0 to time t=1, etc.

Returning to FIG. 3, the image labeling module 308 can be configured to automatically label an object within a two-dimensional image based on three-dimensional position information. As discussed above, the three-dimensional placement module 304 can convert a label of an object in a two-dimensional image into a three-dimensional position of the object within a three-dimensional coordinate space. The position of the object within the three-dimensional coordinate space may include and/or be indicative of the position of the object relative to a vehicle (and/or a camera mounted on the vehicle) within the three-dimensional coordinate space. The modified position calculation module 306 can then utilize the object's position relative to the vehicle at the time the first image was captured, and vehicle SLAM information, to determine an updated three-dimensional position of the object relative to the vehicle at a time associated with a subsequent image. The updated three-dimensional position of the object relative to the vehicle can be used to determine the two-dimensional position of the object in the subsequent image. For example, as discussed above with reference to FIGS. 4C and 4G, at time t=0, a first image 412 may have been captured (FIG. 4C), and at time t=1, a second image 442 may have been captured (FIG. 4G). At time t=0, a label 418 identifying the position of an object (cross-walk sign 408), has a first position relative to the vehicle 402. For example, the four corners of the label 418 may have positions (x1, y1, z1), (x2, y2, z2), (x3, y3, z3), and (x4, y4, z4) with respect to the vehicle 402. At time t=1, the label 418 has a second position relative to the vehicle 402. For example, the four corners of the label 418 may have positions (x5, y5, z5), (x6, y6, z6), (x7, y7, z7), and (x8, y8, z8) relative to the vehicle 402. The updated position of the label 418 can be converted into a two-dimensional position within the image 442. As shown in FIG. 4G, camera information, such as the position of the camera within the three-dimensional coordinate space, angle at which the camera is directed within the three-dimensional coordinate space, and the angle of view of the camera can be utilized to geometrically convert the three-dimensional position of the label 418 into a two dimensional position on the two-dimensional image 442, as marked by a rectangle 444. The image labeling module 308 can be configured to utilize camera information for the camera 404 to automatically convert the three-dimensional position of the label 418 into a two-dimensional position on the image 442, and to automatically generate a label 444 on the image 442.

Figure 4H:
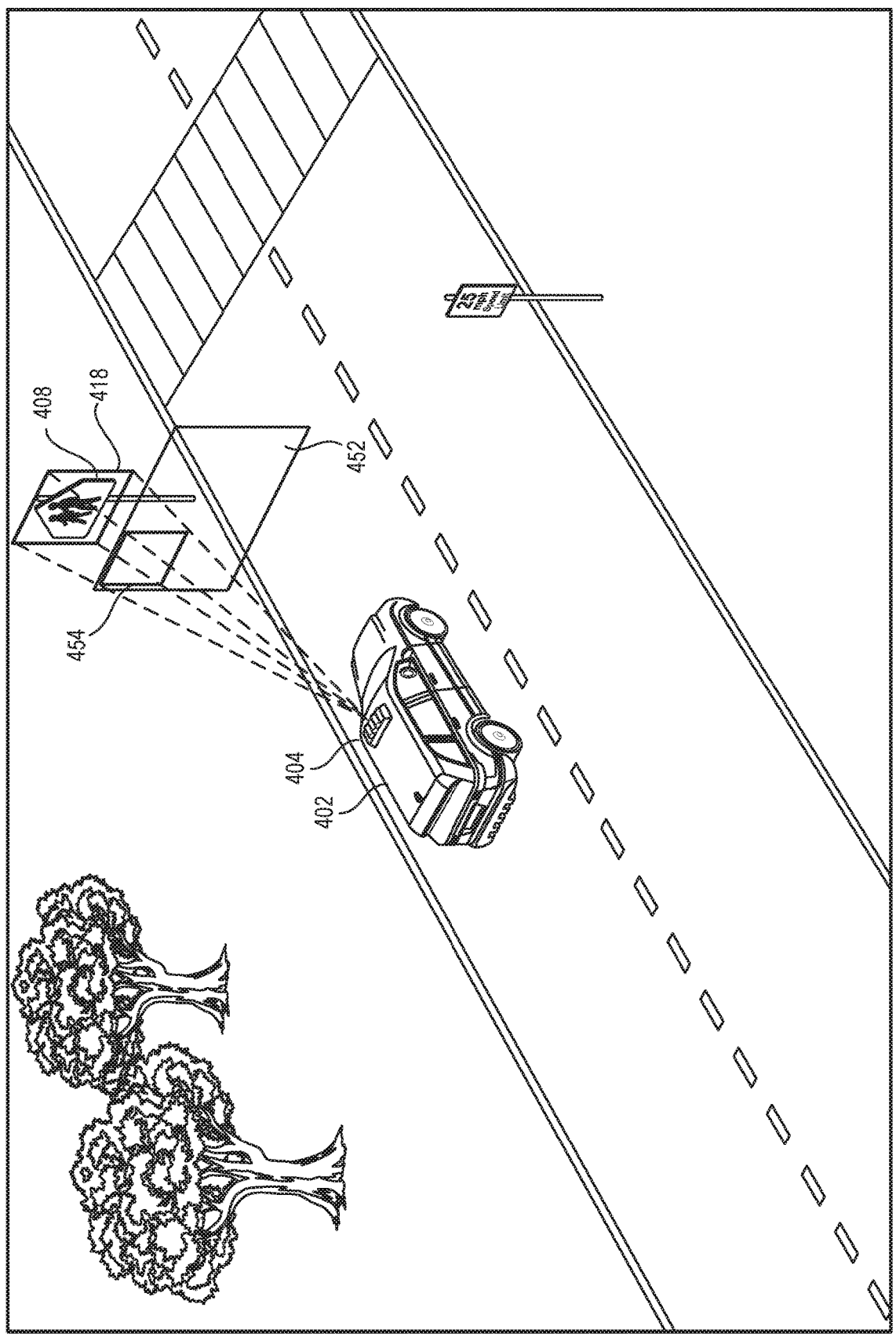

This feature is further demonstrated in FIG. 4H, where, at time t=3, the vehicle 402 has moved forward another 10 feet, and captured a third image 452. Since the vehicle 402 has moved forward 10 feet, and the cross-walk sign 408 has remained still, the position of the label 418 relative to the vehicle 402 has once again moved. SLAM information can be used to calculate an updated position of the label 418 relative to the vehicle 402 (e.g., by the modified position calculation module 306). The updated three-dimensional position of the label 418 relative to the vehicle 402 can be converted into a two dimensional position on the image 452, and a label 454 can automatically be applied to the image 452 (e.g., by the image labeling module 308). This process can be applied to a large number of images (e.g., tens or hundreds of images) to automatically label objects in a set of sequential images captured from a vehicle based on a label received in one of those images.

Figure 5:
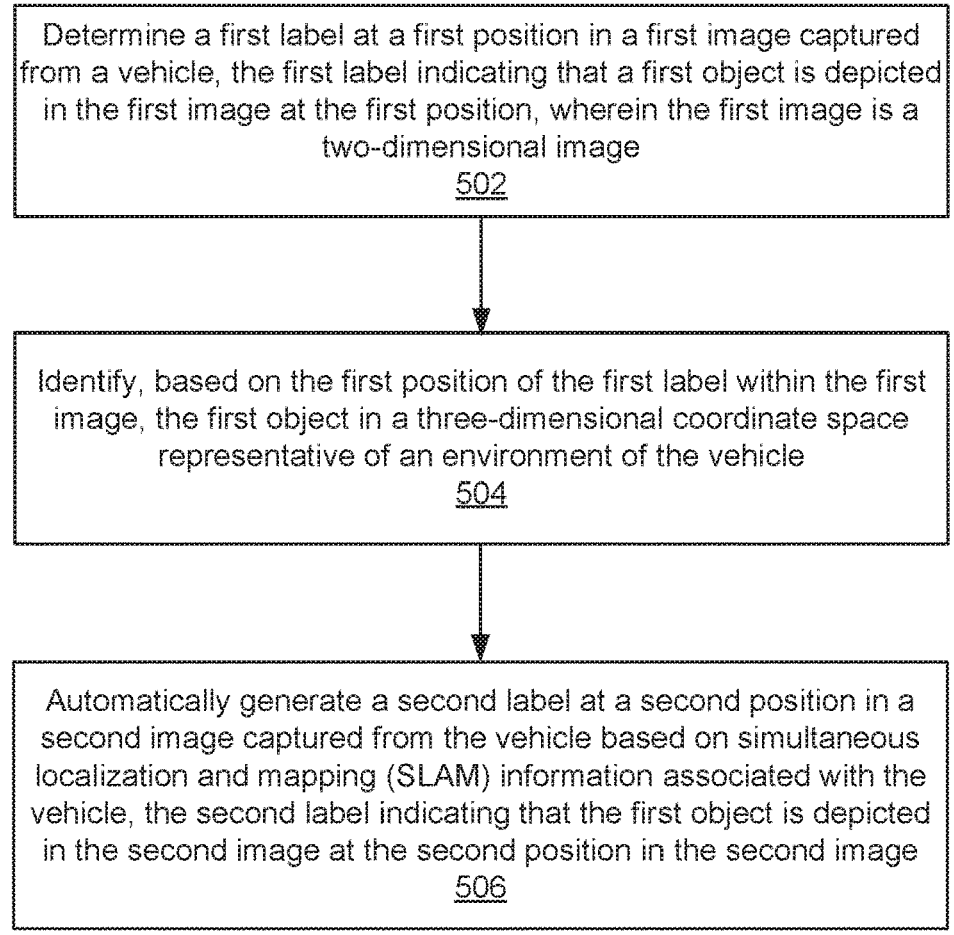
FIG. 5 illustrates an example method, according to an embodiment of the present technology.

FIG. 5 illustrates an example method 500, according to an embodiment of the present technology. At block 502, the example method 500 can determine a first label at a first position in a first image captured from a vehicle, the first label indicating that a first object is depicted in the first image at the first position, wherein the first image is a two-dimensional image. At block 504, the example method 500 can identify, based on the first position of the first label within the first image, the first object in a three-dimensional coordinate space representative of an environment of the vehicle. At block 506, the example method 500 can automatically generate a second label at a second position in a second image captured from the vehicle based on simultaneous localization and mapping (SLAM) information associated with the vehicle, the second label indicating that the first object is depicted in the second image at the second position in the second image.

Many variations to the example method are possible. It should be appreciated that there can be additional, fewer, or alternative steps performed in similar or alternative orders, or in parallel, within the scope of the various embodiments discussed herein unless otherwise stated.

Figure 6:
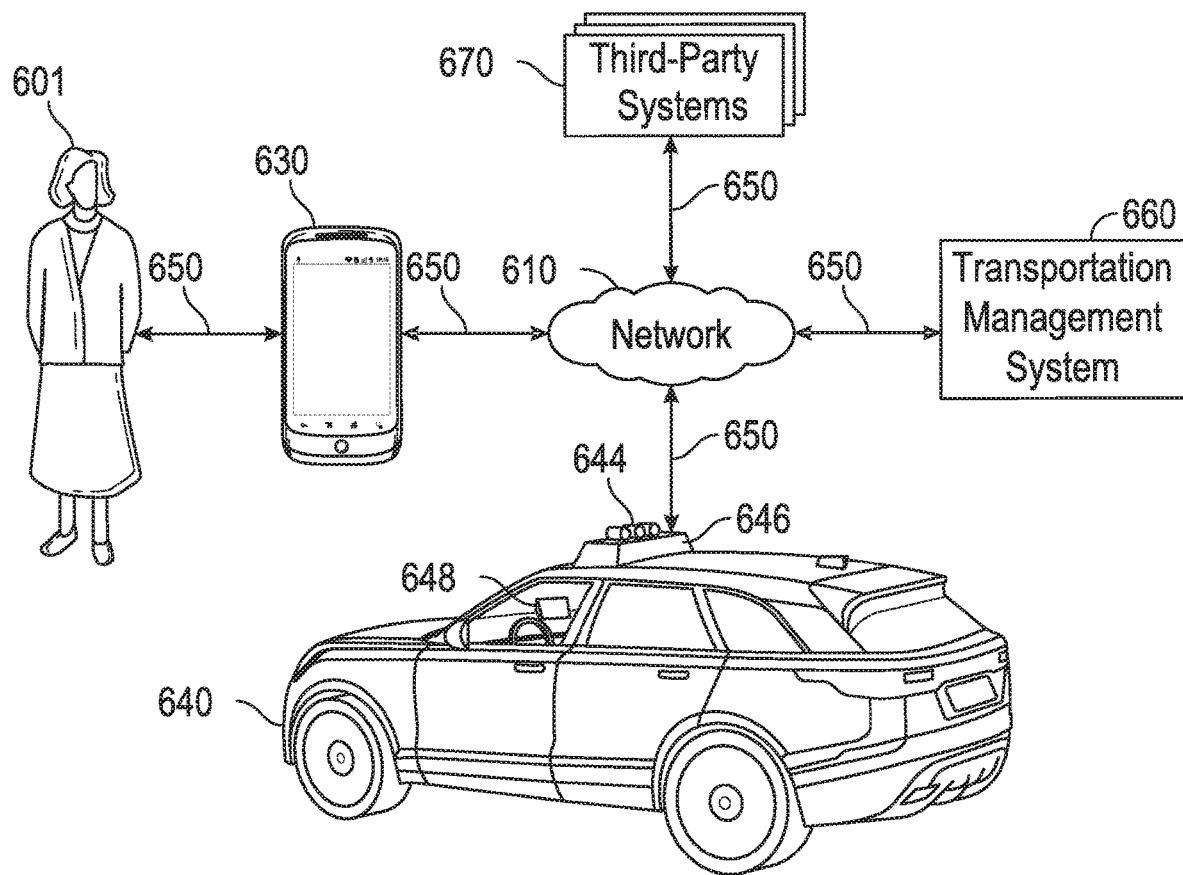
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the automated data labeling module 302 may be implemented by one or more computing systems of the transportation management system 660. In some embodiments, some or all modules of the automated data labeling module 302 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
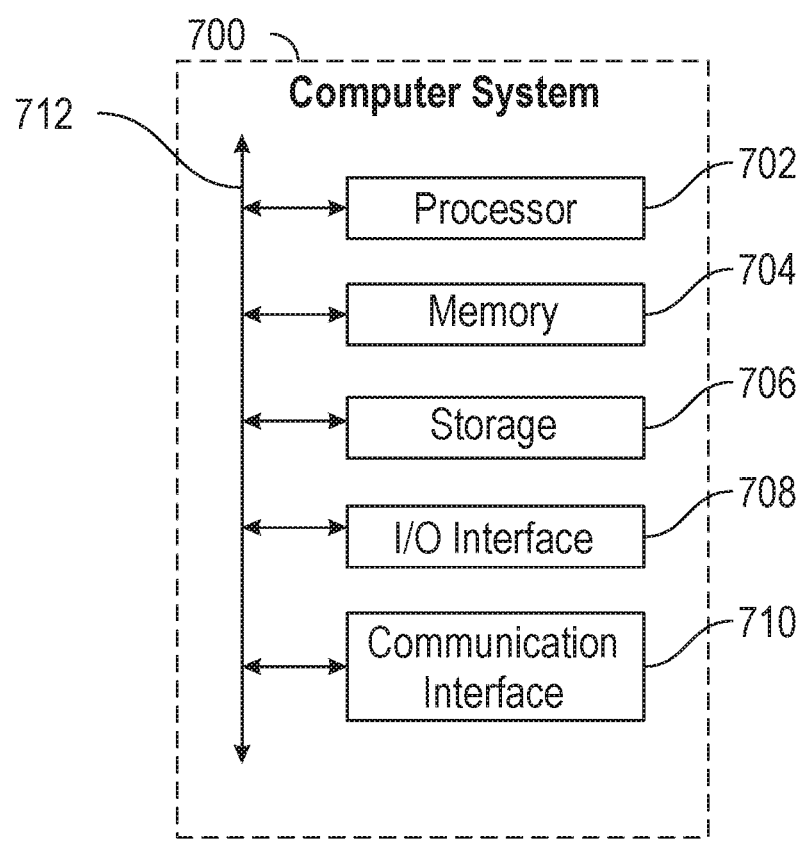
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
    determining, by a computing system, a first label at a first position in a first image captured by a vehicle, wherein the first label indicates an object is depicted in the first image at the first position relative to the vehicle, wherein the first image is a two-dimensional image;
    identifying, by the computing system, based on the first position of the first label the first image, the object in a three-dimensional coordinate space representative of an environment external to the vehicle;
    determining, by the computing system, a movement of the vehicle relative to the object based on simultaneous localization and mapping (SLAM) information associated with the vehicle;
    determining, by the computing system, a second position of the object in the three-dimensional coordinate space based on the movement of the vehicle relative to the object without use of a second image captured by the vehicle; and
    subsequent to determining the second position of the object, generating, by the computing system, a second label at the second position in the second image captured by the vehicle, wherein the second label indicates the object is depicted at the second position in the second image.

2. The computer-implemented method of claim 1, wherein the second label is generated at the second position based on the determination that the object is at the second position.

3. The computer-implemented method of claim 1, wherein the second position is determined further based on vehicle movement information associated with the vehicle, wherein the vehicle movement information includes at least one of: a velocity of the vehicle, an acceleration of the vehicle, a direction traveled by the vehicle, or a distance traveled by the vehicle.

4. The computer-implemented method of claim 1, wherein the second position is determined further based on a predicted location of where the object is predicted to appear in the second image using the SLAM information.

5. The computer-implemented method of claim 1, wherein identifying, based on the first position of the first label in the first image, the object in the three-dimensional coordinate space comprises:
    determining a position of the first label within the three-dimensional coordinate space.

6. The computer-implemented method of claim 5, wherein determining the second position of the object comprises:
    determining, based on the SLAM information associated with the vehicle, a change in position between the object and the vehicle from a first time to a second time, wherein the first image was captured at approximately the first time, and the second image was captured at approximately the second time.

7. The computer-implemented method of claim 6, wherein determining the second position of the object further comprises:
    determining, within the three-dimensional coordinate space, an updated position of the first label with respect to the vehicle based on the first position and the second position.

8. The computer-implemented method of claim 7, wherein determining the second position of the object further comprises:
    converting the updated position of the first label with respect to the vehicle to a two-dimensional position in the second image.

9. The computer-implemented method of claim 1, wherein identifying, based on the first position of the first label, the object in the three-dimensional coordinate space comprises:
    determining an object frustum within the three-dimensional coordinate space based on the first position of the first label in the first image and camera information associated with a camera, and
    determining a nearest object to the vehicle within the object frustum, and further wherein the camera information includes at least one of: a position of the camera within the three-dimensional coordinate space, a direction of the camera within the three-dimensional coordinate space, or an angle of view of the camera.

10. The computer-implemented method of claim 1, wherein determining the first label at the first position in the first image comprises receiving a manual label generated by a human operator viewing the first image.

11. A system comprising:
    at least one processor; and a memory storing instructions that, when executed by the at least one processor, cause the system to perform:
- determining a first label at a first position in a first image captured by a vehicle, wherein the first label indicates an object is depicted in the first image at the first position relative to the vehicle, wherein the first image is a two-dimensional image;
- identifying, based on the first position of the first label the first image, the object in a three-dimensional coordinate space representative of an environment external to the vehicle;
- determining a movement of the vehicle relative to the object based on simultaneous localization and mapping (SLAM) information associated with the vehicle;
- determining a second position of the object in the three-dimensional coordinate space based on the movement of the vehicle relative to the object without use of a second image captured by the vehicle; and
- subsequent to determining the second position of the object, generating a second label at the second position in the second image captured by the vehicle, wherein the second label indicates the object is depicted at the second position in the second image.

12. The system of claim 11, wherein the second label is generated at the second position based on the determination that the object is at the second position.

13. The system of claim 11, wherein the second position is determined further based on vehicle movement information associated with the vehicle, and wherein the vehicle movement information includes at least one of: a velocity of the vehicle, an acceleration of the vehicle, a direction traveled by the vehicle, or a distance traveled by the vehicle.

14. The system of claim 11, wherein the second position is determined further based on a predicted location of where the object should appear in the second image using the SLAM information.

15. The system of claim 11, wherein the identifying, based on the first position of the first label in the first image, the object in the three-dimensional coordinate space comprises:
- determining a position of the first label within the three-dimensional coordinate space.

16. A non-transitory computer-readable storage medium including instructions that, when executed by at least one processor of a computing system, cause the computing system to perform:
- determining a first label at a first position in a first image captured by a vehicle, wherein the first label indicates an object is depicted in the first image at the first position relative to the vehicle, wherein the first image is a two-dimensional image;
- identifying, based on the first position of the first label the first image, the object in a three-dimensional coordinate space representative of an environment external to the vehicle;
- determining movement of the vehicle relative to the object based on simultaneous localization and mapping (SLAM) information associated with the vehicle;
- determining a second position of the object in the three-dimensional coordinate space based on the movement of the vehicle relative to the object without use of a second image captured by the vehicle; and
- subsequent to determining the second position of the object, generating a second label at the second position in the second image captured by the vehicle, wherein the second label indicates the object is depicted at the second position in the second image.

17. The non-transitory computer-readable storage medium of claim 16, wherein the second label is generated at the second position based on the determination that the object is at the second position.

18. The non-transitory computer-readable storage medium of claim 16, wherein the second position is determined further based on vehicle movement information associated with the vehicle, and wherein the vehicle movement information includes at least one of: a velocity of the vehicle, an acceleration of the vehicle, a direction traveled by the vehicle, or a distance traveled by the vehicle.

19. The non-transitory computer-readable storage medium of claim 16, wherein the second position is determined further based on a predicted location of where the object should appear in the second image using the SLAM information.

20. The non-transitory computer-readable storage medium of claim 16, wherein the identifying, based on the first position of the first label in the first image, the object in the three-dimensional coordinate space comprises:
- determining a position of the first label within the three-dimensional coordinate space.

\* \* \* \* \*